United States Patent [19]

Sugi

[11] Patent Number: 5,478,966
[45] Date of Patent: Dec. 26, 1995

[54] HINGED LONG-REACH MAGNETIC DETECTOR FOR LIQUID LEVEL MEASUREMENTS

[75] Inventor: Tokio Sugi, Tokyo, Japan

[73] Assignee: Tokyo Keiso Kabushiki-Kaisha, Tokyo, Japan

[21] Appl. No.: 338,129

[22] Filed: Nov. 9, 1994

[30] Foreign Application Priority Data

Mar. 8, 1994 [JP] Japan .................................. 6-064452

[51] Int. Cl.$^6$ ........................... G01F 23/38; G01B 7/14; H01R 9/09; H01R 35/02
[52] U.S. Cl. .......................... 73/313; 73/308; 73/DIG. 5; 33/723; 324/207.14; 324/207.24; 324/262; 439/31
[58] Field of Search .......................... 324/207.11–207.26, 324/262, 251, 252, 235; 73/290 R, 290 B, 291, 305–308, 313, 314, 318, 319DIG. 5I; 33/723, 724, 729; 361/749, 752, 796; 174/254; 439/31, 67

[56] References Cited

U.S. PATENT DOCUMENTS

| | | | |
|---|---|---|---|
| 1,617,287 | 2/1927 | Huggins | 73/DIG. 5 X |
| 4,000,651 | 1/1977 | Christiansen | 73/DIG. 5 X |
| 4,537,070 | 8/1985 | Milish | 73/DIG. 5 X |
| 4,922,199 | 5/1990 | Fukui et al. | 324/207.17 |

*Primary Examiner*—Sandra L. O'Shea
*Assistant Examiner*—Warren S. Edmonds
*Attorney, Agent, or Firm*—Lowe, Price, LeBlanc & Becker

[57] ABSTRACT

The detector is a foldable one constructed of unit elements 1a–1n connected with each other through hinge members 6. The members 6 are staggered in arrangement along the longitudinal direction of the unfolded or stretched detector so as to permit the detector to be folded in staggered manner. In storage and transport, the detector is folded to facilitate its handling. In installation, the detector is unfolded or stretched to assume a long-reach form to facilitate its installation in a liquid-level gauge system of a storage tank 13.

3 Claims, 4 Drawing Sheets

HINGED LONG-REACH MAGNETIC DETECTOR FOR LIQUID LEVEL MEASUREMENTS

BACKGROUND OF THE INVENTION

1. Field of the Invention

The present invention relates to a long-reach magnetic detector which is used in a liquid-level gauge system of a large-sized storage tank and well adapted to measurement of the liquid level in the large-sized storage tank.

2. Description of the Prior Art

In a conventional liquid-level gauge system for use in storage tanks provided in oil tankers and petroleum installations, a magnetic detector, which is constructed of a plurality of magnetic sensors arranged in a longitudinal row, is mounted inside a protective pipe which is vertically mounted in the storage tank. When the liquid level in the storage tank varies, a magnet, which is fixedly mounted in a floating member movable up and down along the longitudinal direction of the protective pipe, actuates the magnetic sensors of the magnetic detector to determine a current value of the liquid level in the storage tank which may be a large-sized one reaching a height of several tens of meters.

Such large-sized storage tank requires, naturally, a long-reach magnetic detector.

The conventional long-reach magnetic detectors are classified into the following two types:

(a) A long size type of flexible one which is rolled up in transport (hereinafter referred to as the product "a"); and
(b) A short size type of substantially rigid one, a plurality of which are separate in transport while connected with each other through connectors in installation (hereinafter referred to as the product "b").

As for the product "a", it is widely used in these days. However, the product "a" has its components and and soldered portions subjected to large stresses when rolled up, which arouses troubles and failures in electrical contact areas of the components and the soldered portions of the product "a". Consequently, the product "a" is poor in protection of its components and soldered portions.

As shown in FIG. 8, in another type of the product "a", a plurality of electrical components 22, each of which is housed in a box 21, are mounted on a stainless steel strip 20, wired and embedded in a molded rubber compound 23. This type of the product "a" is costly, and requires a large allowable radius of curvature, which makes the handling of the product "a" difficult in transport.

As for the product "b", it was provided by the applicant's company. However, the product "b" was poor in resistance to corrosion, leading to failures of electrical contacts. When the product "b" was used on marine vessels, many troubles such as disconnection of connectors of the product "b" occurred due to vibrations of the marine vessels.

SUMMARY OF THE INVENTION

It is an object of the present invention to provide a long-reach magnetic detector which is free from the the above-mentioned troubles and failures inherent in the conventional long-reach magnetic detectors.

According to a first aspect of the present invention, the above object of the present invention is accomplished by providing:

A long-reach magnetic detector comprising:

a plurality of magnetic sensors mounted on each of a plurality of elongated printed boards at predetermined intervals;

a plurality of insulating members in each of which each of the printed boards carrying the magnetic sensors is embedded;

a plurality of elongated base lever members in each of which each of the insulating members is mounted to form a unit element;

a plurality of band cables for connecting the printed boards of the unit elements with each other; and a plurality of hinge members through each of which adjacent ones of the unit elements in overlaying relationship to each other have their surfaces facing each other connected with each other to form the long-reach magnetic detector.

According to a second aspect of the present invention, the above object of the present invention is accomplished by providing:

A long-reach magnetic detector comprising:

a plurality of magnetic sensors mounted on each of a plurality of elongated printed boards at predetermined intervals;

a plurality of insulating members in each of which each of the printed boards carrying the magnetic sensors is embedded;

a plurality of elongated base lever members in each of which each of the insulating members is mounted to form a unit element;

a plurality of band cables for connecting the printed boards of the unit elements with each other;

a plurality of hinge members through each of which adjacent ones of the unit elements in overlaying relationship to each other have their surfaces facing each other connected with each other to form the long-reach magnetic detector; and a plurality of replay printed boards each of which is mounted on an end portion of each of the unit elements, each of the relay printed boards being provided with an electrically conductive portion an end of which is connected with the band cable extending from the printed board mounted on one of adjacent ones of the unit elements, the other end of the electrically conductive portion being connected with the band cable extending from the printed board mounted on the other one of the adjacent ones of the unit elements.

According to a third aspect of the present invention, the above object of the present invention is accomplished by providing:

A long-reach magnetic detector comprising:

a plurality of magnetic sensors mounted on each of a plurality of elongated printed boards at predetermined intervals;

a plurality of insulating members in each of which each of the printed boards carrying the magnetic sensors is embedded;

a plurality of elongated base lever members in each of which each of the insulating members is mounted to form a unit element;

a plurality of band cables for connecting the printed boards of the unit elements with each other;

a plurality of hinge members through each of which adjacent ones of the unit elements in overlaying relationship to each other have their surfaces facing each other connected with each other to form the long-reach magnetic detector;

a plurality of relay printed boards each of which is mounted on an end portion of each of the unit elements, each of the relay printed boards being provided with an electrically conductive portion an end of which is connected with the band cable extending from the printed board mounted on one of adjacent ones of the unit elements, the other end of the electrically conductive portion being connected with the band cable extending from the printed board mounted on the other one of the adjacent ones of the unit elements; and a plurality of stopper members each of which is mounted on an end of each of the base lever members to permit each of the unit elements to rotate through an angle of 180° relative to each other when the unit elements having been folded or connected through the hinge members into overlaying relationship to each other are unfolded.

Consequently, the long-reach magnetic detector of the present invention is characterized in that:

(a) In storage and transport, it is possible to fold the magnetic detector small, which facilitates the handling of the magnetic detector in a safety manner;

(b) In use, the thus folded magnetic detector is transported to the site of a desired installation, in which the detector is stretched or unfolded to assume a long-reach form, which facilitates the installation of the magnetic detector in the liquid-level gauge system;

(c) Since the magnetic sensors of each of the unit elements of the magnetic detector are already connected with each other through the printed boards, band cables and the relay printed boards in the factory, there is no need for connecting these sensors with each other on the installation site at all; and (d) Since there is no fear that each of the unit elements of the magnetic detector is subjected to large stresses even when the detector is folded, there is substantially no fear that the printed boards and the magnetic sensors are damaged in installation, which ensures the reliability of the the magnetic detector.

DESCRIPTION OF THE PREFERRED EMBODIMENTS

Hereinbelow, the present invention will be described in detail with reference to the accompanying drawings. An embodiment of a long-reach magnetic detector of the present invention is shown in FIGS. 1 to 7.

Figure 1:
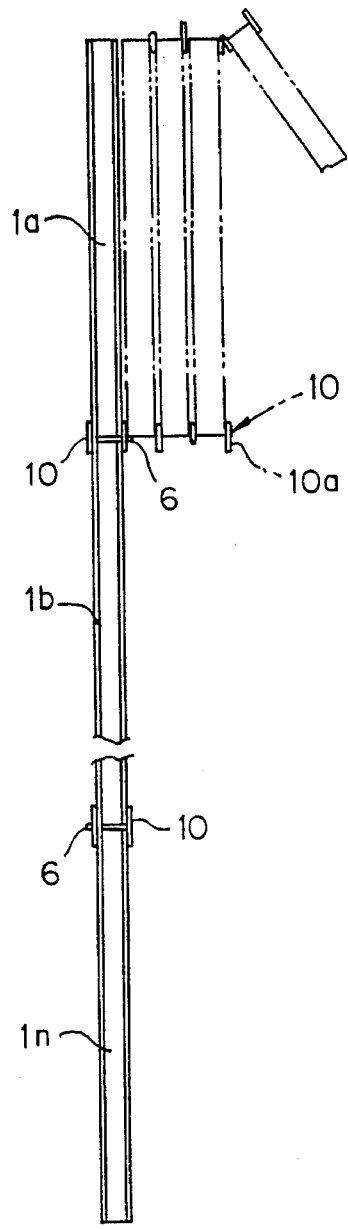
FIG. 1 is a side view of the long-reach magnetic detector of an embodiment of the present invention.

As shown in FIG. 1, the magnetic detector of the present invention is shown in solid lines in its stretched or unfolded condition, and in phantom lines in its folded condition. In the stretched or unfolded condition, the magnetic detector of the present invention has its unit elements $1a$, $1b$, . . . , $1n$ arranged in a longitudinal straight row. On the other hand, in the folded condition, the magnetic detector of the present invention has its unit elements $1a$, $1b$, . . . , in arranged one above the other as shown in phantom lines in FIG. 1.

In each of the unit elements $1a$, $1b$, . . . , $1n$ of the magnetic detector of the present invention, an elongated square tube or channel member serves as each of a plurality of elongated base lever members 1 of the magnetic detector of the present invention, as shown in the drawings. The lever members 1 are made of, for example such as aluminum, light alloys, or plastics. A plurality of magnetic sensors such as Hall devices 2 are fixedly mounted on each of a plurality of printed boards 3. These boards 3 are then disposed inside each of the base lever members 1, and embedded therein in a molded resilient insulating members 4 together with the Hall devices 2. The insulating members 4 are made of synthetic rubbers, epoxy resins, or silicone rubbers.

Figure 3:
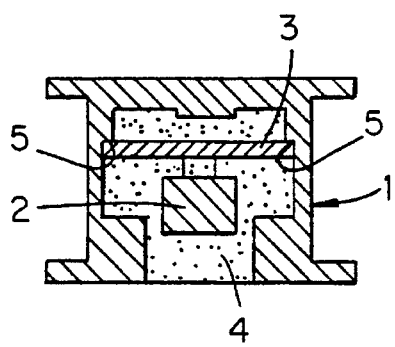
FIG. 3 is a cross-sectional view of the magnetic detector of the present invention, taken along the line III—III of FIG. 2.
Figure 4:
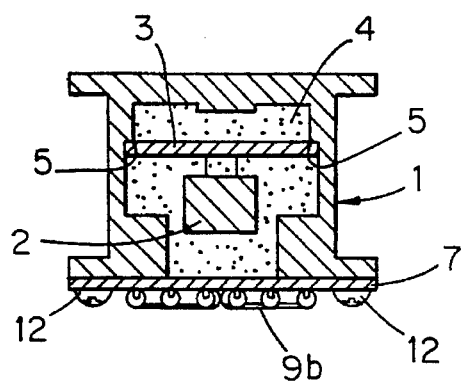
FIG. 4 is a cross-sectional view of the magnetic detector of the present invention, taken along the line IV—IV of FIG. 2.
Figure 5:
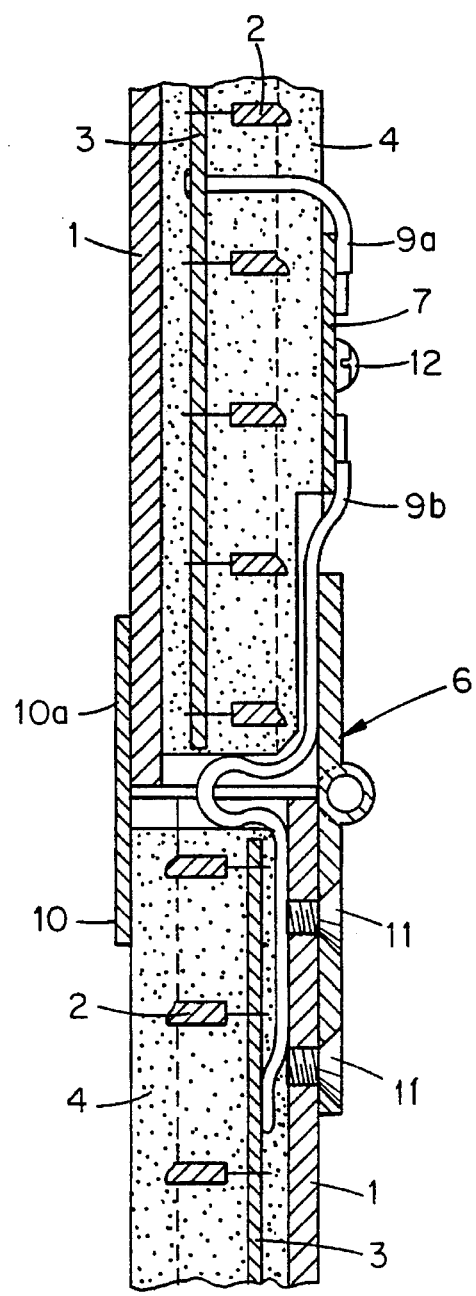
FIG. 5 is a longitudinal sectional view of the magnetic detector of the present invention, taken along the line V—V of FIG. 2.
Figure 6:
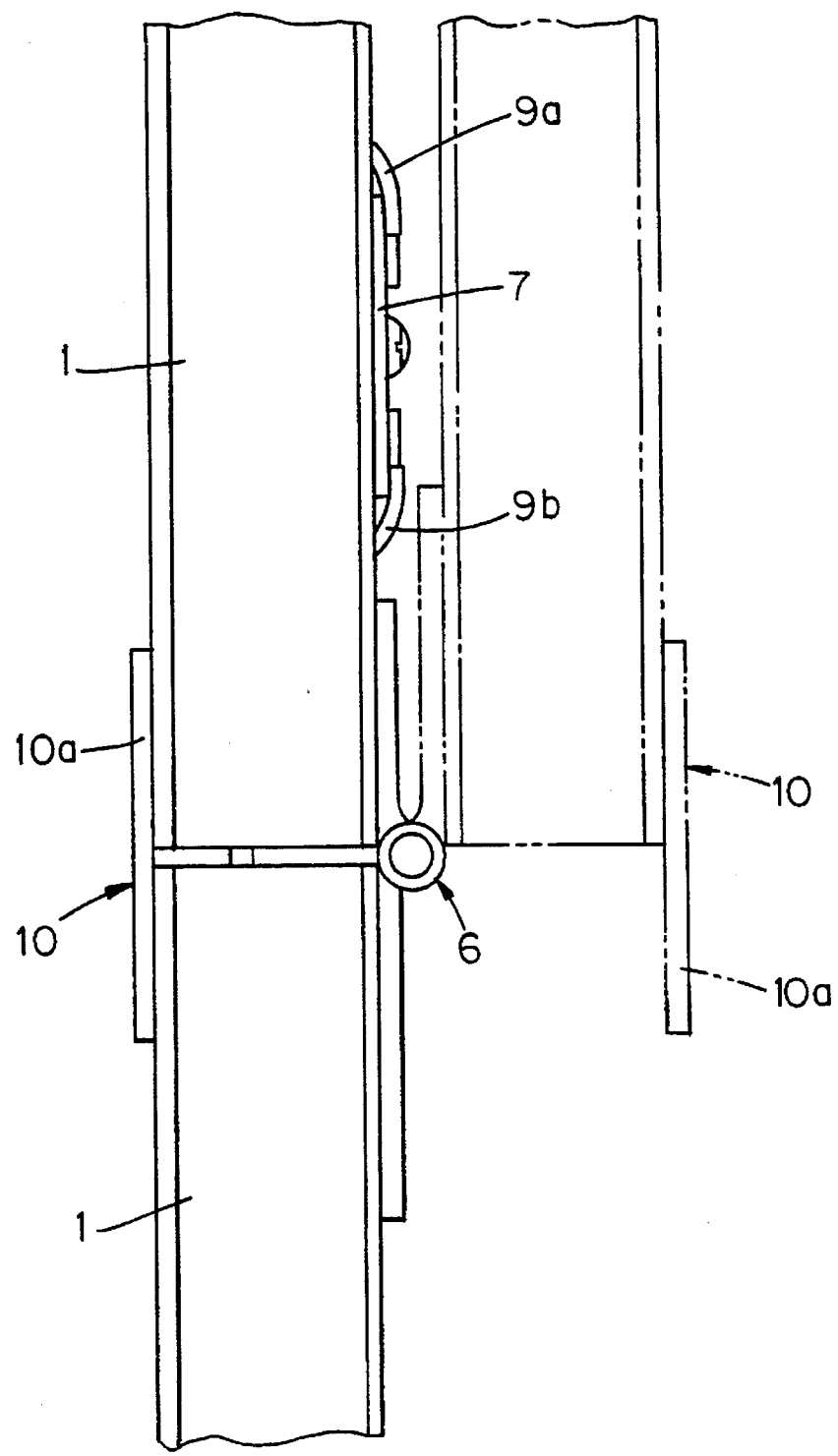
FIG. 6 is a side view of the magnetic detector of the present invention shown in FIG. 2.

The printed boards 3 and the Hall devices 2 are embedded in the molded insulating members 4 as follows: namely, first, the printed board 3 has its widthwise opposite side edge portions placed on opposite left-hand and right-hand inner projections 5 of the base lever member 1 as viewed in FIGS. 3 and 4; and, the remaining area of the interior of the base lever member 1 is filled up with the synthetic rubbers, epoxy resins or the silicone rubbers, which form the molded insulating member 4 after curing thereof.

The magnetic detector of the present invention has its unit elements $1a$, $1b$, . . . , $1n$ arranged in overlying relationship to each other when folded in storage and transport. The unit elements $1a$, $1b$, . . . , $1n$ are connected with each other through hinge members 6 so as to permit the magnetic detector of the present invention to assume a long-reach form when the detector is stretched or unfolded in installation. Namely, as shown in FIG. 1, in the magnetic detector of the present invention: the unit element $1a$ has its right-hand surface connected with the right-hand surface of the following unit element $1b$ through the hinge member 6; and, in turn, the unit element $1b$ has its left-hand surface connected with the left-hand surface of the further following unit element $1c$ (shown in FIG. 7) through the following hinge member 6. As for the remaining unit elements of the magnetic detector of the present invention, they have their right-hand surfaces and left-hand surfaces alternately connected with each other through the hinge members 6 in the same manner as described above. As a result, in the stretched or unfolded condition of the magnetic detector of the present invention, the hinge members 6 are so arranged as to be staggered along the thus stretched or unfolded magnetic detector, as is clear from the solid-line view in FIG. 1.

Figure 2:
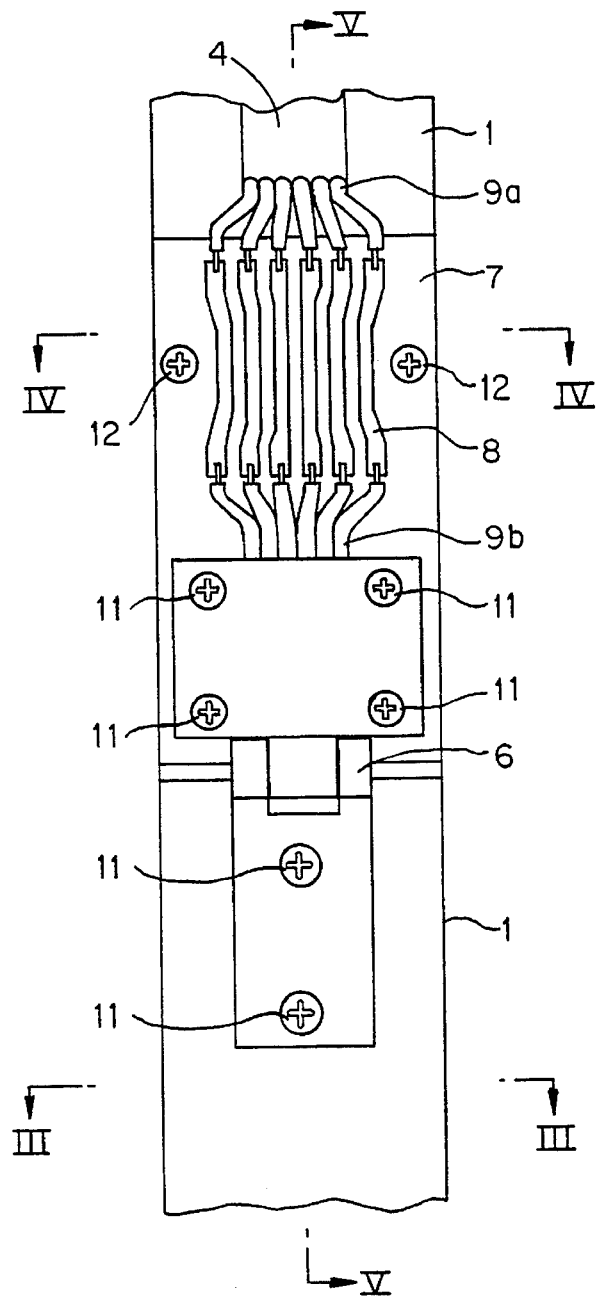
FIG. 2 is a partially enlarged front view of the magnetic detector of the present invention shown in FIG. 1, illustrating the connecting area between the unit elements of the magnetic detector.

As shown in FIG. 2, a relay printed board 7 is mounted on an end portion of each of the base lever members 1. The relay printed board 7 is provided with a plurality of electrically conductive portions 8 each of which has one of its opposite ends soldered onto a band cable 9 extended from the printed board 1. The other of the opposite ends of each of the conductive portions 8 of the relay printed board 7 are soldered onto each of band cables 9b of the following unit element. In the same manner as described above, the printed boards 1 of the remaining unit elements are connected with the band cables through the relay printed boards 7.

A stopper member 10, which is made of synthetic rubbers and the like and is moderate in both rigidity and resiliency, is mounted on an end portion of each of the base lever members 1. When the folded magnetic detector of the present invention is stretched or unfolded in installation, each of the unit elements 1a, 1b, . . . , 1n of the detector is rotated through an angle of 180° relative to each other, and prevented from being further rotated beyond the above angle by the provision of each of the stopper members 10, because a projecting portion 10a of each of the stopper members 10 butts against the following unit element so that these adjacent ones of the unit elements are aligned with each other in the longitudinal direction of the stretched or unfolded magnetic detector.

Further, each of the band cables 9b is provided with a bent portion between adjacent ones of the unit elements 1a, 1b, . . . , 1n, which facilitates the folding and unfolding operations of the magnetic detector of the present invention.

Incidentally, in the drawings: the reference numeral 11 denotes screws for fixedly mounting the hinge members 6 on the unit elements 1a, 1b, . . . , 1n; and, 12 screws for fixedly mounting the relay printed boards 7 on the unit elements 1a, 1b, . . . , 1n.

Figure 7:
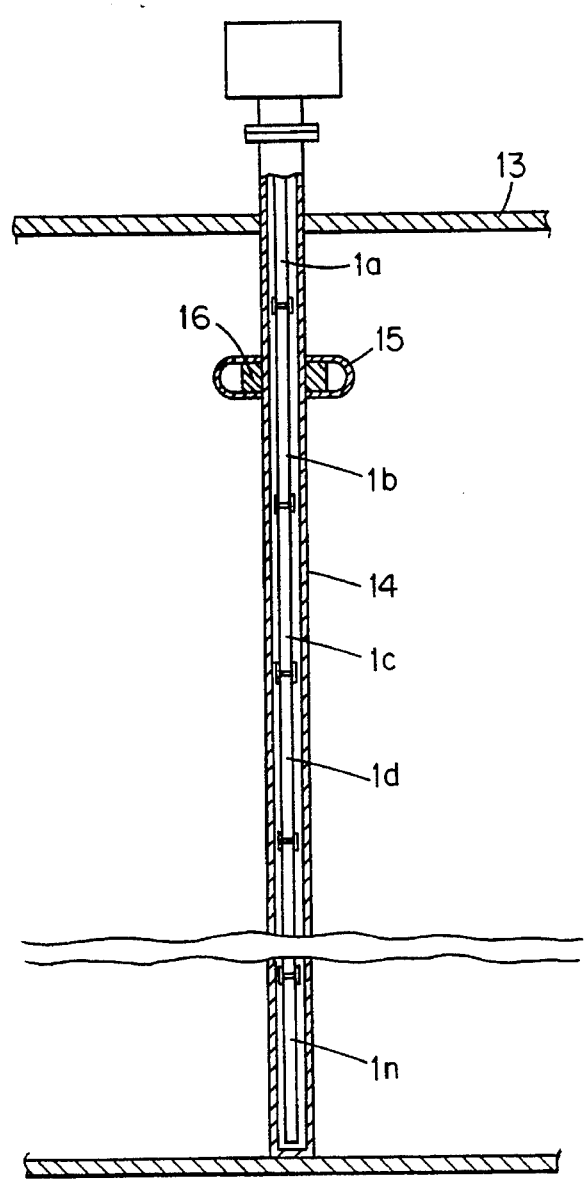
FIG. 7 is a partially broken side view of the magnetic detector of the present invention used in the liquid-level gauge system of the storage tank.
Figure 8:
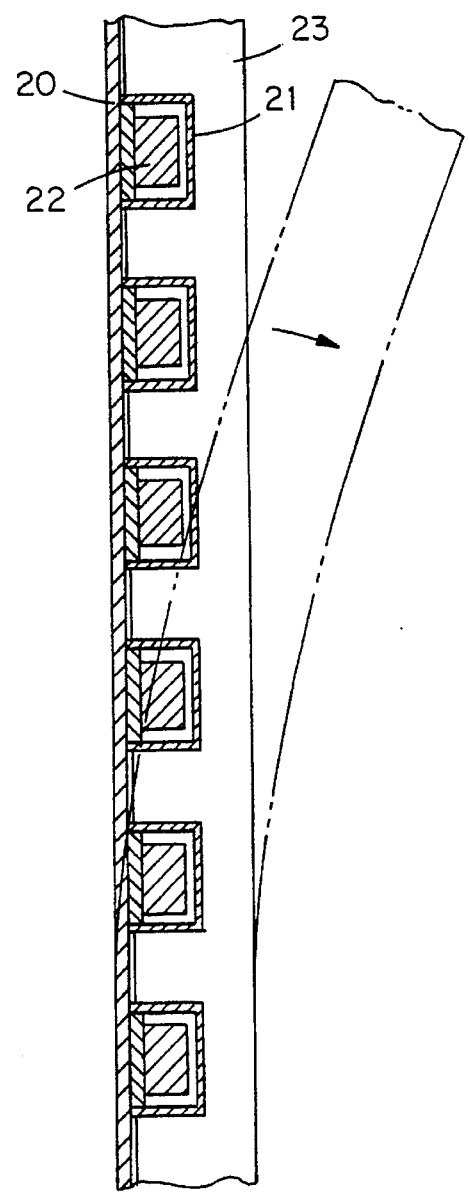
FIG. 8 is a longitudinal sectional view of an example of the conventional long-reach magnetic detector.

The long-reach magnetic detector of the present invention having the above construction isused in, for example, a liquid-level gauge system shown in FIG. 7.

Namely, the folded magnetic detector of the present invention is stretched or unfolded in the installation site thereof, and inserted into a vertical protective pipe 14 disposed inside a storage tank 13. In use, a magnet 16 fixedly mounted inside a floating member 15 movable up and down along the protective pipe 14 actuates the magnetic sensors of the magnetic detector of the present invention when the liquid level in the storage tank 13 varies, so that a current value of the liquid level in the storage tank 13 is detected.

The magnetic detector of the present invention has the following advantages:

In storage and transport, it is possible to fold the magnetic detector small, which facilitates the handling of the magnetic detector in a safety manner;

In use, the thus folded magnetic detector is transported to the site of a desired installation, in which the detector is stretched or unfolded to assume a long-reach form, which facilitates the installation of the magnetic detector in the liquid-level gauge system in the storage tank 13.

Since the magnetic sensors of each of the unit elements of the magnetic detector are already connected with each other through the printed boards, band cables and the relay printed boards in the factory, there is no need for connecting these sensors with each other on the installation site at all; and Since there is no fear that each of the unit elements of the magnetic detector is subjected to large stresses even when the detector is folded,there is substantially no fear that the printed boards and the magnetic sensors are damaged in installation, which ensures the reliability of the magnetic detector.

What is claimed is:

1. A long-reach magnetic detector comprising:

a plurality of magnetic sensors mounted on each of a plurality of elongated printed boards at predetermined intervals;

a plurality of insulating members in each of which each of said printed boards carrying said magnetic sensors is embedded;

a plurality of elongated base lever members in each of which each of said insulating members is mounted to form a unit element;

a plurality of band cables for connecting said printed boards of said unit elements with each other; and a plurality of hinge members through each of which adjacent ones of said unit elements in overlaying relationship to each other have their surfaces facing each other connected with each other to form said long-reach magnetic detector.

2. A long-reach magnetic detector comprising:

a plurality of magnetic sensors mounted on each of a plurality of elongated printed boards at predetermined intervals:

a plurality of insulating members in each of which each of said printed boards carrying said magnetic sensors is embedded;

a plurality of elongated base lever members in each of which each of said insulating members is mounted to form a unit element;

a plurality of band cables for connecting said printed boards of said unit elements with each other;

a plurality of hinge members through each of which adjacent ones of said unit elements in overlaying relationship to each other have their surfaces facing each other connected with each other to form said long-reach magnetic detector; and a plurality of relay printed boards each of which is mounted on an end portion of each of said unit elements, each of said relay printed boards being provided with an electrically conductive portion an end of which is connected with said band cable extending from said printed board mounted on one of adjacent ones of said unit elements, the other end of said electrically conductive portion being connected with said band cable extending from said printed board mounted on the other one of said adjacent ones of said unit elements.

3. A long-reach magnetic detector comprising:

a plurality of magnetic sensors mounted on each of a plurality of elongated printed boards at predetermined intervals;

a plurality of insulating members in each of which each of said printed boards carrying said magnetic sensors is embedded;

a plurality of elongated base lever members in each of which each of said insulating members is mounted to form a unit element;

a plurality of band cables for connecting said said printed boards of said unit elements with each other;

a plurality of hinge members through each of which adjacent ones of said unit elements in overlaying relationship to each other have their surfaces facing each other connected with each other to form said long-reach magnetic detector;

a plurality of relay printed boards each of which is mounted on an end portion of each of said unit elements, each of said relay printed boards being provided with an electrically conductive portion an end of which is connected with said band cable extending from said printed board mounted on one of adjacent ones of said unit elements, the other end of said electrically conductive portion being connected with said band cable extending from said printed board mounted on the other one of said adjacent ones of said unit elements; and a plurality of stopper members each of which is mounted on an end of each of said base lever members to permit each of said unit elements to rotate through an angle of 180° relative to each other when said unit elements having been folded or connected through said hinge members into overlaying relationship to each other are unfolded.

* * * * *